Feb. 14, 1939.  E. ROSS  2,146,767

SPROCKET ASSEMBLY

Original Filed April 11, 1935

Inventor
Ernest Ross

By Orl R. Goshaw

Attorney

Patented Feb. 14, 1939

2,146,767

UNITED STATES PATENT OFFICE 2,146,767

SPROCKET ASSEMBLY

Ernest Ross, North Chili, N. Y., assignor, by mesne assignments, to Radio Corporation of America, a corporation of Delaware Original application April 11, 1935, Serial No. 15,771. Divided and this application February 17, 1938, Serial No. 190,908

6 Claims. (Cl. 74—243)

This invention relates to sprockets for longitudinally advancing strips of flexible material, and particularly to sprockets for advancing motion picture film, the sprockets having spaced sets of teeth to engage perforations in the film. This application is a division of U. S. application Serial No. 15,771, filed April 11, 1935, disclosing a sprocket assembly for general use. This divisional application is directed more particularly to a combination sprocket for simultaneously advancing different sized films.

The use of sprockets in motion picture machines for recording or reproducing pictures and/or sound is well known and many different types of sprockets for this purpose have been suggested and used. With the advent of sound on film, more attention was given to the progressing and guiding of the film through the machines and the maximum construction tolerances of the sprockets were reduced materially. For instance, as the sound track occupies a narrow portion longitudinally of the film, the film cannot be permitted to weave or vary in linear velocity to any considerable extent at the point of translation, for to do so would introduce distortion into the recording and eventual reproduction of the sound. Similarly there should be substantially no movement of the film away from and toward the axis of rotation of the sprocket, such movement causing out-of-focus conditions as well as velocity variations which would produce blurring with consequent sound distortion.

Not only is this true for the recording and reproducing machines themselves, but it is also true for the intermediate machines, such as printers, where films are copied one from the other, since any distortion of the sound track by printing only adds to the final distortion at the time of reproduction. Therefore, all sprockets used for the advancement of talking motion picture film should permit a smooth and uniform progressing of the film over the shoulders of the sprocket upon which the film rests, the sprocket teeth entering the perforations without shifting the film's position on the shoulders. The sprocket should also permit the film to disengage the sprocket teeth smoothly without jerkiness or chattering. This is particularly true in a reduction printer wherein the sound track is being printed from a larger film to a smaller one, since in these printing operations one dimension of the track is varied in a different proportion than the other.

One of the features of this invention is that the sprocket rings or teeth may be ground and lapped in pairs. Another feature is that the particular type of assembly disclosed provides a place intermediate or around the sprocket teeth for dust and loose emulsion, thus preventing the accumulation of such foreign matter on the sides of the teeth or on the shoulders upon which the film rests when passing over the sprocket. The particular sections of the sprocket are simple to construct and facilitate assembly and adjustment upon the driving shaft, the chief objective of the invention being to provide an economical sprocket assembly which drives the film smoothly and uniformly through the machine and which prevents the accumulation of foreign matter from interfering with this action.

Although the novel features which are believed to be characteristic of this invention will be pointed out with particularity in the claims appending herewith, the invention itself, its objects and advantages, the manner of its organization and the mode of its operation, will be better understood by referring to the following description read in conjunction with the accompanying drawing forming a part thereof, in which:

Figure 1:
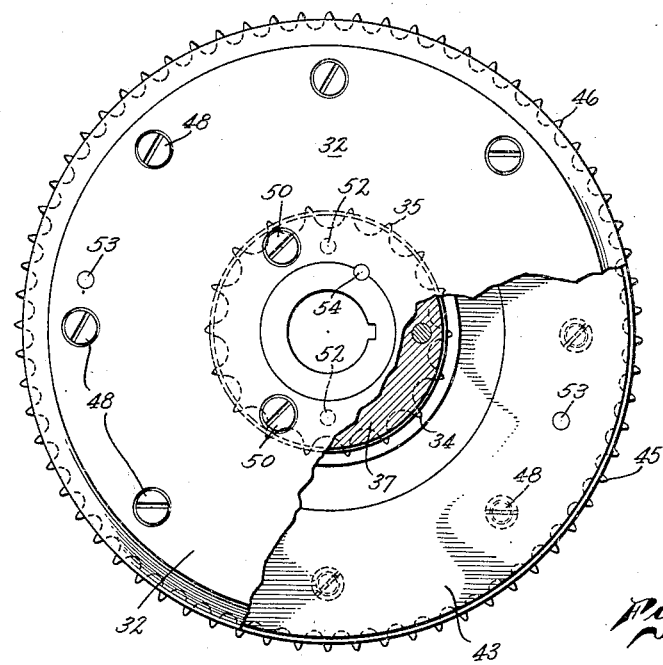
Figure 1 is a plan view of a sprocket embodying the invention.
Figure 2:
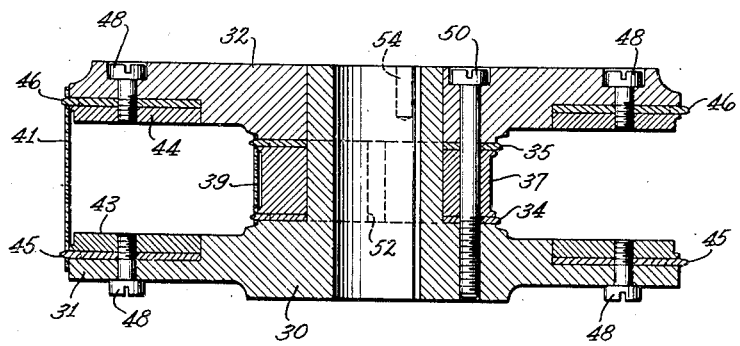
Figure 2 is a cross-sectional view of the sprocket of Fig. 1.

Referring now to the drawing, in which like numerals identify like elements, it will be noted that the sprocket is adapted to drive two films of different sizes, such as, for example, a 35 mm. film 41 and a 16 mm. film 39. A printer using such a sprocket is disclosed in a copending application Serial No. 31,968, filed July 18, 1935.

The sprocket is shown with a barrel or hub portion 30 having an extending collar portion 31 at one end thereof. A similar extending portion 32 is mounted on the hub of section 30 and keyed thereto by a key 54 to form the other end of the assembly. The sections 31 and 32 are properly spaced from each other by sprocket teeth rings 34 and 35 for the film 39 and a cylindrical spacing ring 37, the end portions of the ring 37 having a larger diameter than the main portion of the ring to form shoulders for supporting the film 39. The supporting shoulders for the outside edges of film 39 are formed from the inner portions of sections 31 and 32, as illustrated. For the film 41, the sections 31 and 32 form the support for the external edges of the film, while collars 43 and 44, with extensions on outer faces thereof, form the inner support for film 41. The sprocket teeth rings 45 and 46 drive the larger film in synchronism with the smaller film 39, since the entire sprocket rotates as a unit, and the collars 43 and 44 are mounted on inner hub portions of the sections 31 and 32.

The large sprocket teeth rings 45 and 46 are maintained in position by means of screws 48 passing therethrough and through the sections 31, 32, 43 and 44, the smaller sprocket rings and the whole assembly being held in position by screws 50 which pass transversely of the entire assembly. The smaller sprocket tooth sections are accurately aligned and held in alignment by means of dowels 52, and the larger sprocket tooth rings are accurately maintained in paired position by means of dowels 53, the location of these dowels being previously determined to provide the desired and proper relationship between the inner or smaller teeth and the outer or larger teeth. This relationship is dependent, of course, upon the difference in sizes of the films to be simultaneously progressed by the sprocket and the difference in diameters between the sprockets. Thus, this type of sprocket is particularly desirable for reduction printing, as shown in the above-mentioned copending application.

It is to be noted from the dotted lines in Fig. 1 that the teeth of both the large and small rings of this sprocket have respective root diameters less than the respective external diameters of the shoulders which support the respective films, thus providing recesses or pockets for the collection of extraneous matter which may be rubbed off the film during operation.

A particularly important feature of this sprocket is the manner in which sprocket teeth can be paired and lapped. Sprockets of the solid type having recessing between the teeth necessitate transverse grinding and lapping in view of the integral nature of the barrel and other portions. In the present sprocket construction, a plurality of rings from which the teeth are to be cut may be mounted together on a mandrel and the teeth cut simultaneously, thus providing a perfect uniformity for all teeth as far as angular pitch is concerned. For lapping, one or more of the sections may be ground with a rotating grinding tool positioned transversely thereof and which may be moved, as it rotates, from the throat to the tip of a tooth in the direction that the film leaves the teeth. By so lapping, no transverse ridges are formed to cause the film to chatter as it slides off the tooth, but permits a smooth separation between the tooth and the film. The method of and means for lapping sprocket teeth in this manner is disclosed and claimed in my copending application Serial No. 17,892, filed April 24, 1935. It is obvious that it is a simple matter to assemble this type of sprocket.

It has been found that motion picture printers employing a sprocket of this type have greater accuracy and the sprockets require less attention than those of other types.

I claim:

1. A sprocket assembly for progressing films of different sizes at speeds corresponding to the respective sizes of said films, comprising a body portion having a shoulder portion of increased diameter at one end thereof, a plurality of sprocket teeth sections having an internal diameter corresponding to said body portion and an external diameter intermediate the diameter of said body portion and the diameter of said larger shoulder portion, means to space said sprocket teeth rings on said body portion, a second shoulder portion similar to said first shoulder portion of said body portion having an internal diameter to fit said body portion and an external diameter the same as said first shoulder portion, both of said shoulder portions having a smaller diameter portion recessed therein, a pair of sprocket tooth members adapted to fit said recessed portion, clamp collars adapted to hold said pair of sprocket tooth members in position, and means for maintaining all of said sections in predetermined relationship with respect to one another, all the sprocket tooth members having root diameters less than the respective diameters of the film supporting portions adjacent thereto.

2. A sprocket assembly for progressing films of different sizes at speeds corresponding to the respective sizes of said films, comprising a cylindrical hub portion having an extending shoulder portion at one end thereof, a similar shoulder portion mounted on the other end of said hub portion and having an outer diameter equal to the outer diameter of said first shoulder portion, toothed rings having internal diameters equal to the external diameter of said hub portion and positioned adjacent the inside faces of said shoulder portions, a spacing ring for separating said toothed rings, hubs formed on said first-mentioned shoulder portions, a toothed ring mounted on each hub portion of said shoulder portions, a collar mounted adjacent each toothed ring on said hub portions, means passing through said shoulder portions, last-mentioned rings and collars for maintaining said last-mentioned toothed rings in definite spaced relation with respect to one another, and means passing through said shoulder portions, said first-mentioned toothed rings, and said spacing ring for maintaining all of the above-mentioned elements in assembly.

3. A combination sprocket for films of different sizes comprising a hub portion extending the full width of said assembly and having integral therewith a larger diameter shoulder portion, a similar shoulder portion of equal outside diameter mounted on the other end of said hub portion, a pair of small toothed sprocket rings mounted on said hub portion and intermediate said shoulder portions, a spacing ring for maintaining said small rings a predetermined distance apart, a second pair of larger toothed sprocket rings mounted adjacent the inner faces of said shoulder portions, clamp collars abutting said larger sprocket rings, and means for maintaining all of said sprocket rings in a fixed spatial relationship to one another.

4. A combination sprocket for different sized films comprising a hub portion having a larger diameter integral shoulder portion at one end thereof, a similar shoulder portion of equal outside diameter mounted on the other end of said hub portion, a pair of small toothed rings mounted on said hub portion and intermediate said shoulder portions, and a second pair of larger toothed rings mounted on similar hubs formed on said shoulder portions, all of said sprocket toothed rings having root diameters less than the respective diameters of the film supporting portions adjacent thereto.

5. A combination sprocket assembly for different sized films comprising a central hub portion, larger diameter shoulder portions extending from each end of said hub portion, a pair of small toothed sprocket rings mounted on said hub portion intermediate said shoulder portions, a pair of larger toothed sprocket rings mounted on hubs formed on the inside faces of said shoulder portions, and means for mounting all of said rings in fixed spatial relationship with one another intermediate said shoulder portions, said pair of smaller toothed rings being mounted intermediate said larger toothed rings.

6. A combination sprocket assembly for different sized films comprising a central hub portion having an integral extension from one end thereof adapted to form a support for two different sized films, a similar portion mounted at the other end of said hub portion for supporting the opposite edges of said different sized films, said extending portions having internal hubs formed thereon, a pair of smaller toothed sprocket rings mounted on said central hub portion adjacent said extending portions, a spacing ring for maintaining said smaller rings a predetermined distance apart, a pair of larger toothed sprocket rings, each of which is mounted on a respective hub portion of said extending portions, a respective collar for each of said larger rings mounted on said hub portions, and means for maintaining all of said sprocket rings in a definite, fixed, spatial relationship to one another, said sprocket toothed rings having root diameters less than the respective diameters of the film supporting portions adjacent thereto.

ERNEST ROSS.